United States Patent
Lee et al.

(10) Patent No.: US 12,236,092 B2
(45) Date of Patent: Feb. 25, 2025

(54) MEMORY SYSTEM FOR CONTROLLING LATENCY AND METHOD OF OPERATING THE SAME

(71) Applicant: SK hynix Inc., Gyeonggi-do (KR)

(72) Inventors: Seon Ju Lee, Gyeonggi-do (KR); Ki Tae Kim, Gyeonggi-do (KR); In Ho Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 39 days.

(21) Appl. No.: 18/082,586

(22) Filed: Dec. 16, 2022

(65) Prior Publication Data
US 2024/0036731 A1 Feb. 1, 2024

(30) Foreign Application Priority Data
Jul. 27, 2022 (KR) .................. 10-2022-0093510

(51) Int. Cl.
*G06F 3/06* (2006.01)
(52) U.S. Cl.
CPC ............ *G06F 3/061* (2013.01); *G06F 3/0653* (2013.01); *G06F 3/0679* (2013.01)
(58) Field of Classification Search
CPC ...... G06F 3/061; G06F 3/0653; G06F 3/0679; G06F 3/0659
See application file for complete search history.

(56) References Cited

U.S. PATENT DOCUMENTS

| | | | |
|---|---|---|---|
| 2015/0046684 A1* | 2/2015 | Mehrara | G06F 8/433 |
| | | | 712/220 |
| 2017/0244391 A1* | 8/2017 | Wang | G06F 1/324 |
| 2019/0079697 A1* | 3/2019 | Suzuki | G06F 3/0659 |
| 2020/0294562 A1* | 9/2020 | Hasbun | G06F 12/0859 |
| 2022/0229582 A1* | 7/2022 | Rao | G06F 3/0635 |
| 2022/0334727 A1* | 10/2022 | Xing | G06F 3/0653 |
| 2023/0418476 A1* | 12/2023 | Eun | G06F 3/0679 |

FOREIGN PATENT DOCUMENTS

| | | |
|---|---|---|
| KR | 10-2019-0043868 A | 4/2019 |
| KR | 10-2020-0060154 A | 5/2020 |
| KR | 10-2021-0013845 A | 2/2021 |
| KR | 10-2021-0026103 A | 3/2021 |

* cited by examiner

*Primary Examiner* — Tasnima Matin
(74) *Attorney, Agent, or Firm* — IP & T GROUP LLP

(57) ABSTRACT

Provided herein may be a memory system and a method of operating the same. A memory controller may include a latency monitoring component configured to generate information about a number of occurrences of over-latency exceeding a preset reference latency among latencies each indicating a time amount required from a time point at which first command is received from an external device to a time point at which a completion response to the first command is transmitted to the external device during a first period, and a completion response controller configured to determine a first target latency based on the information about the number of occurrences of over-latency, and provide, during a second period following the first period, the external device with a completion response to a second commands provided from the external device after the first target latency has elapsed.

18 Claims, 15 Drawing Sheets

FIG. 4

| # of over latency | K1<br>(FIRST WEIGHT) | K2<br>(SECOND WEIGHT) |
|---|---|---|
| 0~a1 | 1 | 0 |
| a1~a2 | x1 | y1 |
| a2~a3 | x2 | y2 |
| a3~a4 | x3 | y3 |
| a4~a5 | x4 | y4 |
| a5~ | 0 | 1 |

Predetermined Table for parameters $x1 > x2 > x3 > x4$
$y1 < y2 < y3 < y4$
$a1 < a2 < a3 < a4 < a5$

FIG. 6

| # of over latency | TARGET LATENCY |
|---|---|
| 0~a1 | latency_avg |
| a1~a2 | x1*latency_avg + y1*latency_max |
| a2~a3 | x2*latency_avg + y2*latency_max |
| a3~a4 | x3*latency_avg + y3*latency_max |
| a4~a5 | x4*latency_avg + y4*latency_max |
| a5~ | latency_max |

Predetermined Table for Target Latency

Target Latency = k1*latency_avg + k2*latency_max

MEMORY SYSTEM FOR CONTROLLING LATENCY AND METHOD OF OPERATING THE SAME

CROSS-REFERENCE TO RELATED APPLICATION

The present application claims priority under 35 U.S.C. § 119(a) to Korean patent application number 10-2022-0093510, filed on Jul. 27, 2022, the entire disclosure of which is incorporated herein by reference.

BACKGROUND

1. Field of Invention

Various embodiments of the present disclosure generally relate to an electronic device, and more particularly to a memory system and a method of operating the memory system.

2. Description of Related Art

A storage device is a device which stores data under the control of a host device such as a computer, a smartphone, or a smartpad. Examples of the storage device include a device such as a hard disk drive (HDD) which stores data in a magnetic disk, and a device such as a solid state drive (SSD) or a memory card which stores data in a semiconductor memory, particularly, a nonvolatile memory, according to the device in which data is stored.

A memory system roughly includes a memory device which stores data and a memory controller which controls the memory device. The memory controller controls the memory device to store data in the corresponding memory cell area when a data write request for the memory device is received. Further, the memory controller controls the memory device to load data included in the corresponding memory cell area when a data read request for the memory device is received. Furthermore, the memory controller may provide a completion response indicating that processing for the request from the host has been completed.

Because a storage space of the memory device is limited, an operation such as wear leveling or garbage collection (GC) may be performed such that the memory device may be efficiently used. In this case, processing of a plurality of commands provided from the host may be delayed. That is, a command processing delay unexpected by the host may occur. Therefore, when processing completion responses to commands are uniformly provided, possibility of prediction by the host may be improved.

SUMMARY

Various embodiments of the present disclosure are directed to a memory system that provides uniform performance even in a sustain state and a method of operating the memory system.

An embodiment of the present disclosure may provide for a memory controller. The memory controller may include a latency monitoring component configured to generate information about a number of occurrences of over-latency exceeding a preset reference latency among latencies each indicating a time amount required from a time point at which first command is received from an external device to a time points at which a completion response to the first command is transmitted to the external device, during a first period, and a completion response controller configured to determine a first target latency based on the information about the number of occurrences of over-latency, and provide, during a second period following the first period, the external device with a completion response to a second command, provided from the external device after the first target latency has elapsed.

An embodiment of the present disclosure may provide for a memory system. The memory system may include a memory device including a plurality of memory blocks, and a memory controller configured to delay a completion response to a second command provided from a host during a second period following a first period, based on a number of occurrences of over-latency exceeding a preset reference latency among latencies each indicating a time amount required from a time point at which a first command for the memory device is received from the host to a time point at which a completion response to the first command is provided during the first period.

An embodiment of the present disclosure may provide for a method of operating a memory controller. The method may include counting a number of occurrences of over-latency exceeding a preset reference latency among latencies each indicating a time amount required from a time point at which a first command is received from an external device to a time point at which a completion response to the first command is transmitted to the external device during a first period, and delaying a completion response to a second command provided from the external device during a second period following the first period depending on a first target latency determined based on the number of occurrences of over-latency.

An embodiment of the present disclosure may provide for a method of operating a memory controller. The method may include providing a host with a response to a request from the host, a latency being defined as a time amount between the request and the response, and increasing the latency when a number of occurrences of over-latencies is greater that a threshold during a predetermined section, the over-latency being the time amount greater than a reference.

BRIEF DESCRIPTION OF THE DRAWINGS

FIG. 4 is a diagram illustrating parameters determined depending on the number of occurrences of over-latency according to an embodiment of the present disclosure.

FIG. 6 is a diagram illustrating target latency determined depending on the number of occurrences of over-latency according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
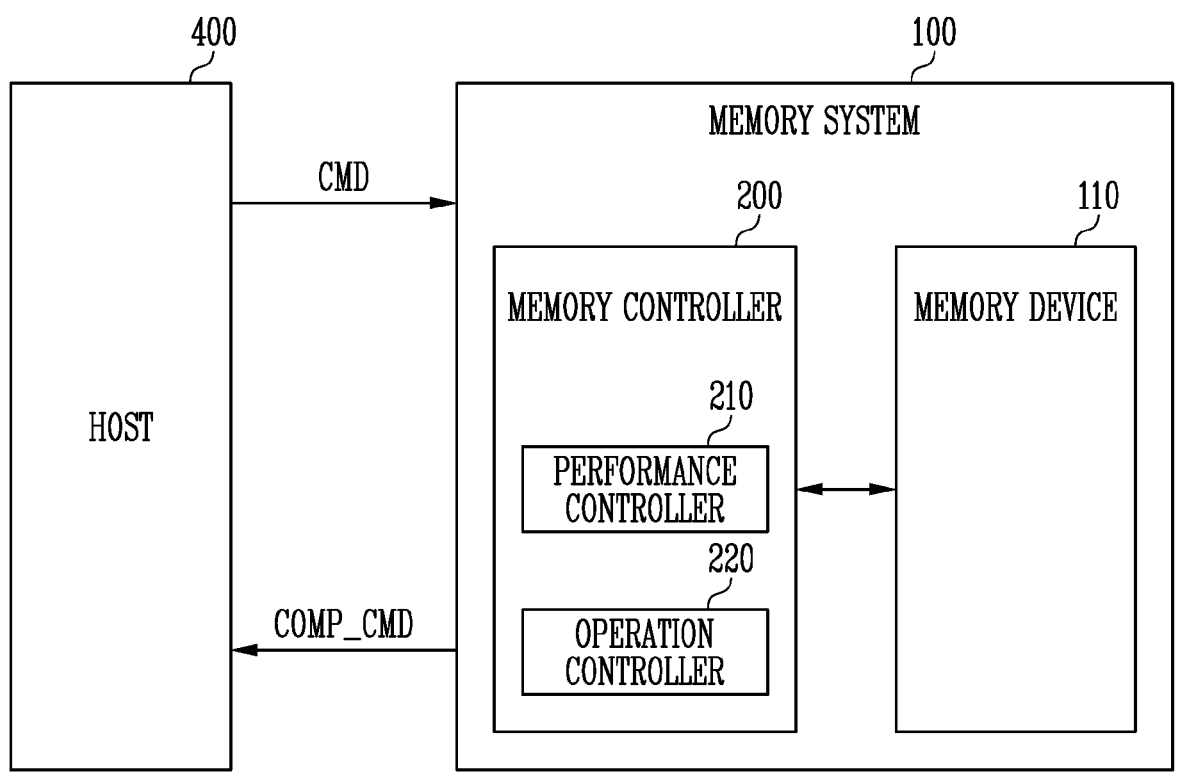
FIG. 1 is a diagram illustrating a memory system according to an embodiment of the present disclosure.

FIG. 1 is a diagram illustrating a memory system 100 according to an embodiment of the present disclosure.

Referring to FIG. 1, the memory system 100 may include a memory device 110 and a memory controller 200.

The memory system 100 may be a device which stores data under the control of a host 400, such as a mobile phone, a smartphone, an MP3 player, a laptop computer, a desktop computer, a game console, a TV, a tablet PC, or an in-vehicle infotainment system.

The memory system 100 may be manufactured as any of various types of storage devices depending on a host interface that is a scheme for communication with the host 400. For example, the memory system 100 may be implemented as any of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The memory system 100 may be manufactured in any of various types of package forms. For example, the memory system 100 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 110 may store data. The memory device 110 may be operated under the control of the memory controller 200. The memory device 110 may include a memory cell array including a plurality of memory cells which store data. The memory cell array may include a plurality of memory blocks. Each memory block may include a plurality of memory cells. One memory block may include a plurality of pages. In an embodiment, a page may be the unit by which data is stored in the memory device 110 or the unit by which data stored in the memory device 110 is read. A memory block may be the unit by which data is erased. In an embodiment, the memory device 110 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory, a resistive RAM (RRAM), a phase-change RAM (PRAM), a magnetoresistive RAM (MRAM), a ferroelectric RAM (FRAM), or a spin transfer torque RAM (STT-RAM). For convenience of description, in the present specification, a description is made on that the memory device 110 is a NAND flash memory.

In an embodiment, the memory system 100 may be implemented as a three-dimensional (3D) array structure. The present disclosure may be applied not only to a flash memory device in which a charge storage layer is formed of a conductive floating gate (FG), but also to a charge trap flash (CTF) memory device in which a charge storage layer is formed of an insulating layer.

In an embodiment, each of the memory cells included in the memory device 110 may be implemented as a single-level cell (SLC) capable of storing one data bit. Alternatively, each of the memory cells included in the memory device 110 may be implemented as a multi-level cell (MLC) capable of storing two data bits, a triple-level cell (TLC) capable of storing three data bits, or a quad-level cell (QLC) capable of storing four data bits.

The memory device 110 may receive a command and an address from the memory controller 200, and may access the area of the memory cell array, selected by the address. That is, the memory device 110 may perform an operation corresponding to the command on the area selected by the address. For example, the memory device 110 may perform a write operation (i.e., a program operation), a read operation, and an erase operation. During a program operation, the memory device 110 may program data to the area selected by the address. During a read operation, the memory device 110 may read data from the area selected by the address. During an erase operation, the memory device 110 may erase data stored in the area selected by the address.

The memory controller 200 may control the overall operation of the memory system 100.

When power is applied to the memory system 100, the memory controller 200 may run firmware (FW). When the memory device 110 is a flash memory device, the memory controller 200 may run firmware such as a flash translation layer (FTL) for controlling communication between the host 400 and the memory device 110.

In an embodiment, the memory controller 200 may receive data and a logical block address (LBA) from the host 400, and may translate the logical block address into a physical block address (PBA) indicating the address of memory cells which are included in the memory device 110 and in which data is to be stored. Further, the memory controller 200 may store a logical-physical address mapping table, which configures mapping relationships between logical block addresses (LBA) and physical block addresses (PBA), in a buffer memory (not illustrated).

The memory controller 200 may control the memory device 110 so that a write operation, a read operation or an erase operation is performed in response to a request received from the host 400. During a program operation, the memory controller 200 may provide a write command, a physical block address (PBA), and data to the memory device 110. During a read operation, the memory controller 200 may provide a read command and a physical block address (PBA) to the memory device 110. During an erase operation, the memory controller 200 may provide an erase command and a physical block address (PBA) to the memory device 110.

The memory controller 200 may include a performance controller 210 and an operation controller 220.

In an embodiment, the performance controller 210 may provide a completion response to a command requested by the host 400. The command requested by the host 400 may be a read command or a write command. When the host 400 provides a command, the memory controller 200 may control the memory device 110 to process the command. When processing of the command from the host 400 is completed by the memory controller 200, the performance controller 210 in the memory controller may provide a command completion response to the host 400. Here, the performance controller 210 may delay the command completion response to be provided to the host 400.

In an embodiment, the operation controller 220 may determine the state of the memory device 110. The state of the memory device 110 may be determined depending on the number of free blocks, among the plurality of memory blocks included in the memory device 110. Such a free block may be a memory block in which data is not stored, among the plurality of memory blocks.

In an embodiment, the operation controller 220 may monitor latency depending on the state of the memory device 110. Latency may be the time required from a time point at which the host 400 provides a command to a time point at which the performance controller 210 provides a completion response to the command. Further, the operation controller 220 may count the number of occurrences of over-latency. Over-latency may be latency longer than a preset reference value. Furthermore, the operation controller 220 may determine whether to delay a command completion response based on the number of occurrences of over-latency. The operation controller 220 may provide information about whether to delay a command completion response and the extent of the delay to the performance controller 210.

In an embodiment, the memory system 100 may include a buffer memory (not illustrated). For example, the buffer memory may temporarily store data received from the host 400 or data received from the memory device 110, or may temporarily store metadata (e.g., mapping tables) of the memory device 110. The buffer memory may include volatile memories, such as DRAM, SDRAM, DDR SDRAM, LPDDR SDRAM, and GRAM, or nonvolatile memories, such as FRAM, ReRAM, STT-MRAM, and PRAM. The buffer memory (not illustrated) may include a target latency information storage (not illustrated). In various embodiments, the memory system 200 may not include a buffer memory (not illustrated). In this case, volatile memory devices disposed outside the memory system 200 may function as the buffer memory (not illustrated).

The host 400 may communicate with the memory system 100 using at least one of various communication methods such as universal serial bus (USB), Serial AT Attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), load reduced DIMM (LRDIMM), and Inter-Integrated Circuit (I2C) communication using system management bus (SM-BUS).

Figure 2:
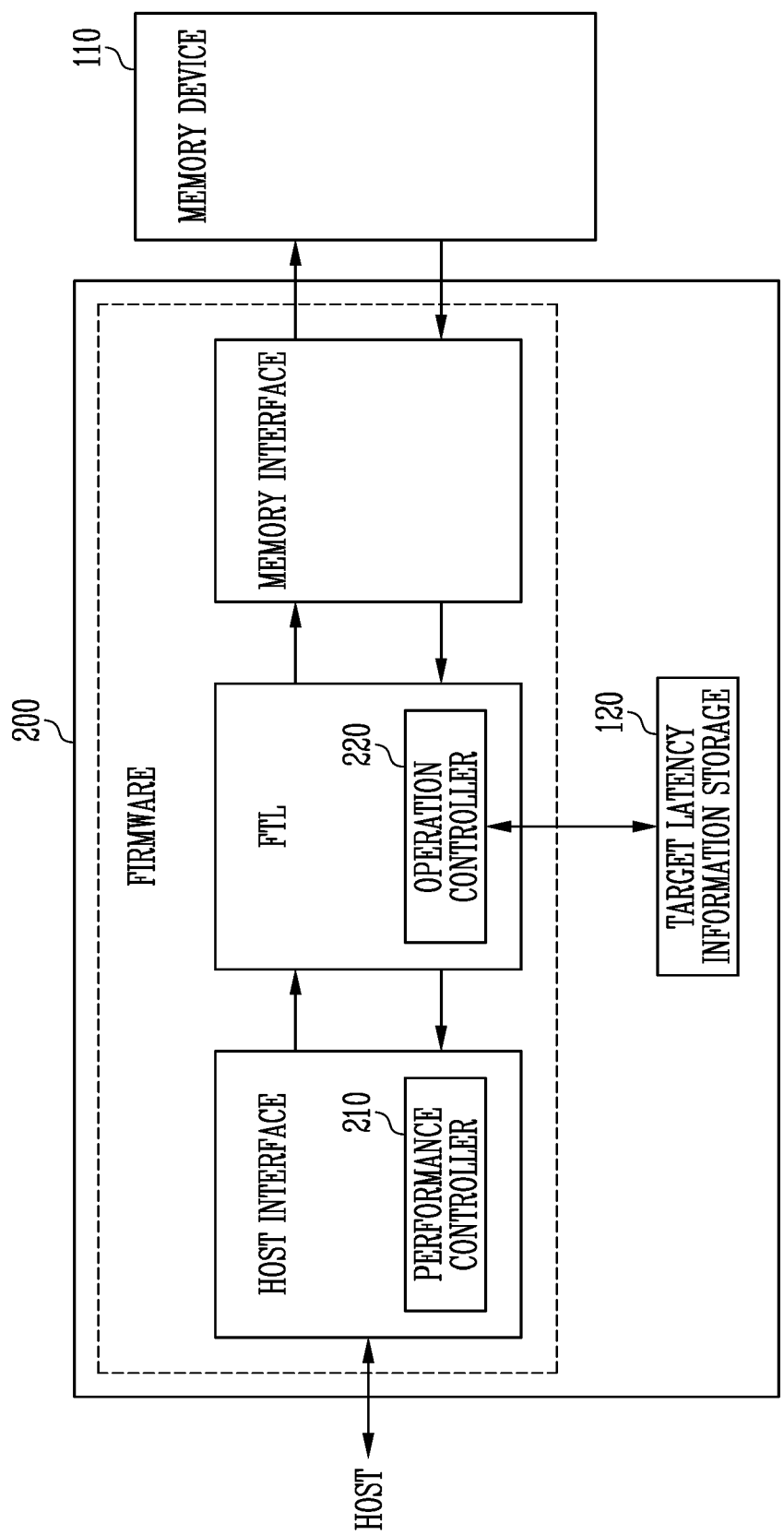
FIG. 2 is a diagram illustrating the firmware of a memory controller of FIG. 1 according to an embodiment of the present disclosure.

FIG. 2 is a diagram illustrating the firmware of the memory controller of FIG. 1 according to an embodiment of the present disclosure.

When power is applied to a memory system, the memory controller 200 may run firmware (FW). When the memory device 110 is a flash memory device, the firmware (FW) may include a host interface layer (HIL) which controls communication with a host, a flash translation layer (FTL) which controls communication between the host and the memory device 110, and a flash interface layer (FIL) which controls communication with the memory device 110. The flash interface layer (FIL) may be a memory interface.

In an embodiment, the performance controller 210 may be included in the host interface layer (HIL). The performance controller 210 may delay a command completion response to be provided to the host while communicating with the host.

In an embodiment, the operation controller 220 may be included in the flash translation layer (FTL). When the host provides a logical block address (LBA) and a command, the flash translation layer (FTL) may translate the logical block address into a physical block address, and controls communication with the memory device 110 to perform an operation corresponding to the translated physical block address. Further, the flash interface layer (FIL) may provide an interface between the host and the memory device 110 so that the memory device 110 is efficiently used. For example, the flash translation layer (FTL) may translate a logical address received from the host into a physical address that is used in the memory device 110. Furthermore, the flash translation layer (FTL) may internally generate a write command, an address, and data without receiving a request from the host, and may transmit them to the memory device 110. For example, the memory controller 200 may provide commands, addresses, and data required for performing background operations, such as a program operation for wear leveling and a program operation for garbage collection (GC), to the memory device 110.

Figure 3:
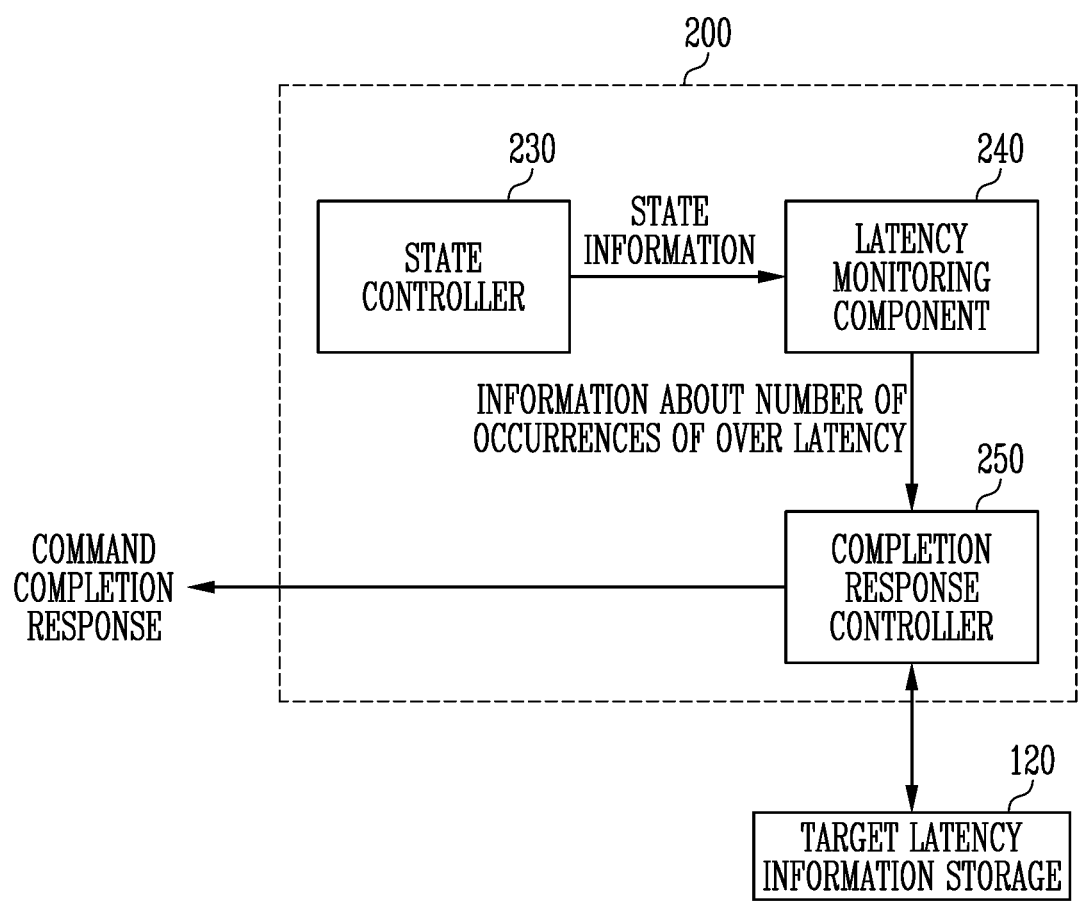
FIG. 3 is a diagram illustrating the structure and operation of a memory controller according to an embodiment of the present disclosure.

FIG. 3 is a diagram illustrating the structure and operation of a memory controller according to an embodiment of the present disclosure.

Referring to FIG. 3, the memory controller 200 may include a state controller 230, a latency monitoring component 240, and a completion response controller 250.

In an embodiment, the state controller 230 may determine the state of the memory device. The state controller 230 may determine the state of the memory device 110 depending on the number of free blocks, among a plurality of memory blocks included in the memory device. Such a free block may be a memory block in which data is not stored, among the plurality of memory blocks in the memory device. The state controller 230 may determine the state of the memory device to be a sustain state when the number of free blocks is less than a reference value. The reference value may be a preset value. When the number of free blocks is less than the reference value, a garbage collection (GC) operation may be initiated. Further, the sustain state may be the state in which the garbage collection (GC) operation is performed to store data. The state controller 230 may provide state information, indicating the state of the memory device, to the latency monitoring component 240 when the state of the memory device is determined.

The latency monitoring component 240 may receive the state information from the state controller 230. The latency monitoring component 240 may receive state information indicating that the memory device 110 is in a sustain state. When the memory device is in the sustain state, the latency monitoring component 240 may measure latency for a preset time (a first period). A time point and a time amount of the measuring may be preset. During this process, the latency monitoring component 240 may count the number of occurrences of over-latency that is latency exceeding a preset reference value. Furthermore, the latency monitoring component 240 may provide information about the number of occurrences of over-latency to the completion response controller 250.

The latency monitoring component 240 may measure latency for the preset time and provide the information about the number of occurrences of over-latency to the completion response controller 250, and thereafter may repeat the above-described operations for a preset time (a second period). The preset time length of the second period may be equal to that of the first period. Similarly, the latency monitoring component 240 may repeat the above-described operations for a third period. The preset time length of the third period may be equal to that of the second period. The above-described operations may be repeated for an n-th period, and the preset time length of the n-th period may be equal to that of an n–1-th period. Here, n may be a natural number.

The latency monitoring component 240 may not perform an operation of measuring latency and counting the number of occurrences of over-latency unless the memory device is in a sustain state.

The completion response controller 250 may receive information about the number of occurrences of over-latency from the latency monitoring component 240. The completion response controller 250 may determine whether to delay a command completion response to be provided to the host depending on the number of occurrences of over-latency. Further, the completion response controller 250 may determine the extent of delay of the command completion response to be provided to the host. The extent of delay of the command completion response may be proportional to the number of occurrences of over-latency.

The completion response controller 250 may receive information about target latency from the target latency information storage 120. The target latency may be latency determined depending on the number of occurrences of over-latency. Further, the target latency may be a prestored value. Details of the target latency will be described later with reference to FIGS. 4 to 6.

The completion response controller 250 may basically delay a command completion response to limit performance in a sustain state. Latency measured in this process may be an average latency.

The completion response controller 250 may determine the target latency based on the information about the number of occurrences of over-latency and the target latency information. When the target latency is determined, the extent of performance delay required for maintaining the target latency may be determined. In an embodiment, when a completion response waiting time, which is the time from a time point at which a command is received from the host to a time point before a completion response to the command is provided, is shorter than the target latency, the completion response controller 250 may delay a completion response by the difference between the target latency and the completion response waiting time. When the completion response waiting time is longer than the target latency, the completion response controller 250 may immediately provide the command completion response to the host.

Although the target latency information storage 120 is illustrated as being disposed outside the memory controller 200, it may also be disposed inside the memory controller 200. The target latency information storage 120 may store parameters determined depending on the number of occurrences of over-latency. Also, the target latency information storage 120 may store in advance the target latency determined depending on the number of occurrences of over-latency. The target latency may be determined based on the parameters determined depending on the number of occurrences of over-latency. The target latency information storage 120 may provide the target latency information to the completion response controller 250. The completion response controller 250 may determine the target latency based on the target latency information and the number of occurrences of over-latency.

FIG. 4 is a diagram illustrating parameters determined depending on the number of occurrences of over-latency according to an embodiment of the present disclosure.

Referring to FIG. 4, a relationship between parameters for determining target latency may be checked.

The parameters for determining the target latency may be a first weight K1 and a second weight K2. The first weight may be a parameter to be multiplied by average latency. Also, the second weight may be a parameter to be multiplied by the maximum latency. The average latency may be latency occurring on average in a sustain state. The maximum latency may be latency incurred to achieve the performance corresponding to minimum performance requested by a host.

The first weight and the second weight may be determined depending on the number of occurrences of over-latency. The values of the first weight and the second weight corresponding to the number of occurrences of over-latency may be preset values. Referring to the table of FIG. 4, when the number of occurrences of over-latency is less than a1, the value of the first weight may be 1, and the value of the second weight may be 0. When the number of occurrences of over-latency is less than a1, additional performance delay may not occur.

When the number of occurrences of over-latency is equal to or greater than a1 and less than a2, the first weight to be multiplied by the average latency may be x1. Further, the second weight to be multiplied by the maximum latency may be y1. When the number of occurrences of over-latency is equal to or greater than a2 and less than a3, the first weight to be multiplied by the average latency may be x2. Further, the second weight to be multiplied by the maximum latency may be y2. When the number of occurrences of over-latency is equal to or greater than a3 and less than a4, the first weight to be multiplied by the average latency may be x3. Further, the second weight to be multiplied by the maximum latency may be y3. When the number of occurrences of over-latency is equal to or greater than a4 and less than a5, the first weight to be multiplied by the average latency may be x4. Further, the second weight to be multiplied by the maximum latency may be y4. Similarly, when the number of occurrences of over-latency is equal to or greater than a5, the first weight to be multiplied by the average latency may be 0. Further, the second weight to be multiplied by the maximum latency may be 1.

The value of the first weight may be decreased in proportion to the number of occurrences of over-latency. On the other hand, the value of the second weight may be increased in proportion to the number of occurrences of over-latency. Therefore, the values of the first weight, that is, x1, x2, x3, and x4, may be values ranging from 0 to 1, wherein the value of x1 may be greater than that of x4. Similarly, the values of the second weight, that is, y1, y2, y3, and y4, may be values ranging from 0 to 1, wherein the value of y4 may be greater than that of y1. Information about the first weight and the second weight may be stored in advance in the target latency information storage.

For convenience of description, although the entire period is described as being roughly divided into six sections depending on the number of occurrences of over-latency, it will be understood that the number of sections may be changed, and the entire period may be divided into more densely or sparsely set sections depending on the number of occurrences of over-latency.

Figure 5:
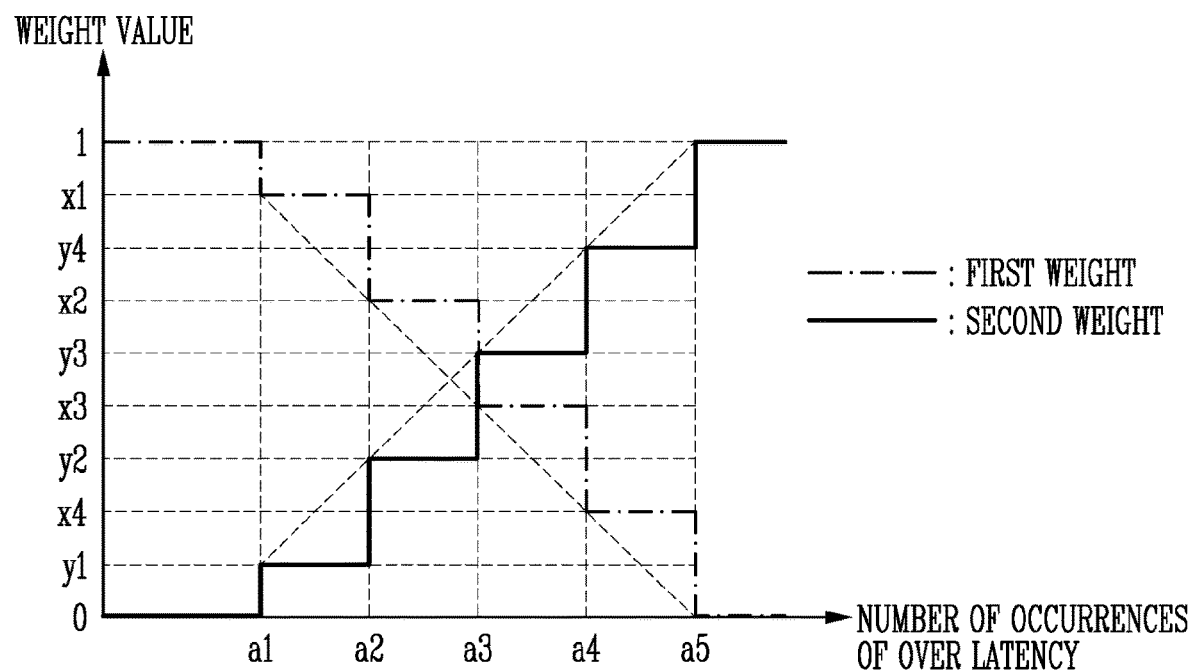
FIG. 5 is a graph illustrating a relationship between the parameters of FIG. 4 according to an embodiment of the present disclosure.

FIG. 5 is a graph illustrating a relationship between the parameters of FIG. 4 according to an embodiment of the present disclosure.

Referring to FIG. 5, a relationship between the first weight and the second weight based on the description of FIG. 4 may be checked.

When the number of occurrences of over-latency is less than a1, the first weight may have a value of 1, and the second weight may have a value of 0. In this case, the sum of the values of the first weight and the second weight may be 1. Further, when the number of occurrences of over-latency is equal to or greater than a1 and less than a2, the first weight may have a value of x1, and the second weight may have a value of y1. In this case, the sum of the values of the first weight and the second weight may be 1. Further, when the number of occurrences of over-latency is equal to or greater than a2 and less than a3, the first weight may have a value of x2, and the second weight may have a value of y2. In this case, the sum of the values of the first weight and the second weight may be 1. Furthermore, when the number of occurrences of over-latency is equal to or greater than a3 and less than a4, the first weight may have a value of x3, and the second weight may have a value of y3. In this case, the sum of the values of the first weight and the second weight may be 1. Furthermore, when the number of occurrences of over-latency is equal to or greater than a4 and less than a5, the first weight may have a value of x4, and the second weight may have a value of y4. In this case, the sum of the values of the first weight and the second weight may be 1. Furthermore, when the number of occurrences of over-latency is equal to or greater than a5, the first weight may have a value of 0, and the value of the second weight may have a value of 1. In this case, the sum of the values of the first weight and the second weight may be 1.

As described above, the sum of the values of the first weight and the second weight may be '1' in all sections. In addition, as described above with reference to FIG. 4, the sections divided from the period may be more densely or sparsely set depending on the number of occurrences of over-latency.

FIG. 6 is a diagram illustrating target latency determined depending on the number of occurrences of over-latency according to an embodiment of the present disclosure.

Referring to FIG. 6, equations and values of target latency determined depending on the number of occurrences of over-latency are represented. Over-latency may be represented by the sum of a value obtained by multiplying the first weight by the average latency and a value obtained by multiplying the second weight by the maximum latency. The average latency may be the average value of latencies incurred in a sustain state. The maximum latency may be a latency incurred to achieve performance corresponding to the minimum performance requested by the host.

In an embodiment, when the number of occurrences of over-latency is present between 0 and a1, the value of the first weight may be 1. Further, the value of the second weight may be 0. Therefore, the target latency calculated by summing a value, which is obtained by multiplying the first weight of 1 by the average latency, and a value, which is obtained by multiplying the second weight of 0 by the maximum latency, may be the average latency latency_avg.

In an embodiment, when the number of occurrences of over-latency is present between a1 and a2, the value of the first weight may be x1. Further, the value of the second weight may be y1. Therefore, the target latency calculated by summing a value, which is obtained by multiplying the first weight of x1 by the average latency, and a value, which is obtained by multiplying the second weight of y1 by the maximum latency, may be $x1*latency\_avg+y1*latency\_max$.

In an embodiment, when the number of occurrences of over-latency is present between a2 and a3, the value of the first weight may be x2. Further, the value of the second weight may be y2. Therefore, the target latency calculated by summing a value, which is obtained by multiplying the first weight of x2 by the average latency, and a value, which is obtained by multiplying the second weight of y2 by the maximum latency, may be $x2*latency\_avg+y2*latency\_max$.

In an embodiment, when the number of occurrences of over-latency is present between a3 and a4, the value of the first weight may be x3. Further, the value of the second weight may be y3. Therefore, the target latency calculated by summing a value, which is obtained by multiplying the first weight of x3 by the average latency, and a value, which is obtained by multiplying the second weight of y3 by the maximum latency, may be $x3*latency\_avg+y3*latency\_max$.

In an embodiment, when the number of occurrences of over-latency is present between a4 and a5, the value of the first weight may be x4. Further, the value of the second weight may be y4. Therefore, the target latency calculated by summing a value, which is obtained by multiplying the first weight of x4 by the average latency, and a value, which is obtained by multiplying the second weight of y4 by the maximum latency, may be $x4*latency\_avg+y4*latency\_max$.

Similarly, in an embodiment, when the number of occurrences of over-latency is equal to or greater than a5, the value of the first weight may be 0. Further, the value of the second weight may be 1. Therefore, the target latency calculated by summing a value, which is obtained by multiplying the first weight of 0 by the average latency, and a value, which is obtained by multiplying the second weight of 1 by the maximum latency, may be the maximum latency latency_max.

The values of the target latency may be values predefined depending on the number of occurrences of over-latency. The values of the target latency may be stored in the form of a table, as illustrated in FIG. 6. The table of target latency values may be stored in a target latency information storage. Although the entire period is divided into six sections depending on the number of occurrences of over-latency for convenience of description, the number of sections may be changed depending on settings, and the values of target latency corresponding to the sections may also be changed.

Figure 7:
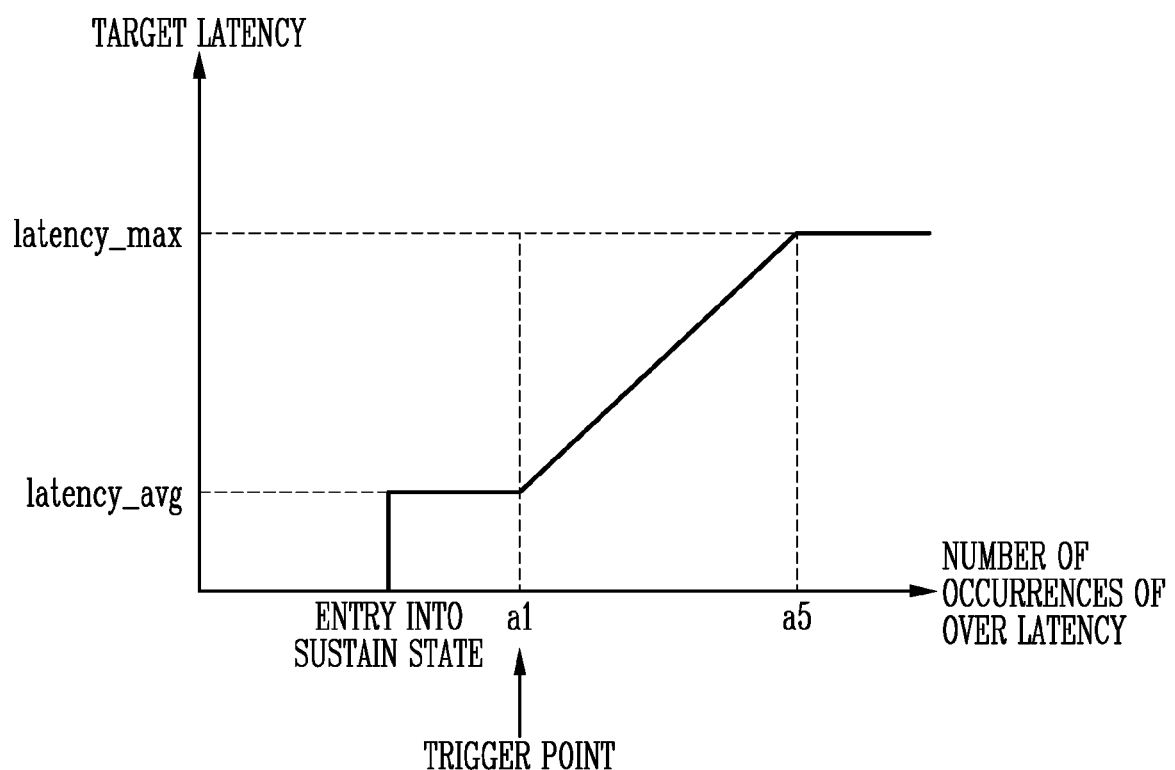
FIG. 7 is a graph illustrating a proportional relationship between the number of occurrences of over-latency and the target latency according to an embodiment of the present disclosure.

FIG. 7 is a graph illustrating a proportional relationship between the number of occurrences of over-latency and the target latency according to an embodiment of the present disclosure.

Referring to FIG. 7, the value of the target latency may be increased in proportion to the number of occurrences of over-latency. When a memory device enters a sustain state, a garbage collection (GC) operation may be performed, and processing of a command provided by a host may be delayed. Therefore, when the memory device enters the sustain state, the target latency may be set, and a command completion response may be delayed depending on the target latency.

When the number of occurrences of over-latency is less than a1, the target latency may be an average latency latency_avg. That is, additional performance limitation other than average performance limitation occurring in the sustain state may not occur. In this case, the memory controller may provide a command completion response to the host in conformity with the average latency latency_avg.

When the number of occurrences of over-latency is equal to or greater than a1, the target latency may be increased in proportion to the number of occurrences of over-latency. When the number of occurrences of over-latency is equal to or greater than a1, the value of the target latency becomes greater than that of the average latency. In this case, in order to maintain the latency incurred in response to the command provided by the host at the target latency, an additional performance limitation may occur. That is, the moment at which the number of occurrences of over-latency is equal to or greater than a1 may be a trigger point at which an additional performance limitation (i.e., additional throttling) occurs.

When the number of occurrences of over-latency is equal to or greater than a5, the target latency may be the maximum latency latency_max. In this case, in order to maintain the latency incurred in response to the command provided by the host at the target latency, an additional performance limitation may occur. Because the target latency should not be greater than the maximum latency, the maximum performance limitation may occur. That is, the memory controller may provide a command completion response to the host in conformity with the maximum latency latency_max.

For convenience of description, although a graph having continuous values has been described to indicate a proportional relationship between the target latency and the number of occurrences of over-latency, the target latency may be a constant value determined depending on the section corresponding to the number of occurrences of over-latency, as illustrated in FIG. 6. Further, as described above with reference to FIG. 7, the target latency may be increased in proportion to the number of occurrences of over-latency rather than being determined depending on the number of occurrences of over-latency.

Figure 8:
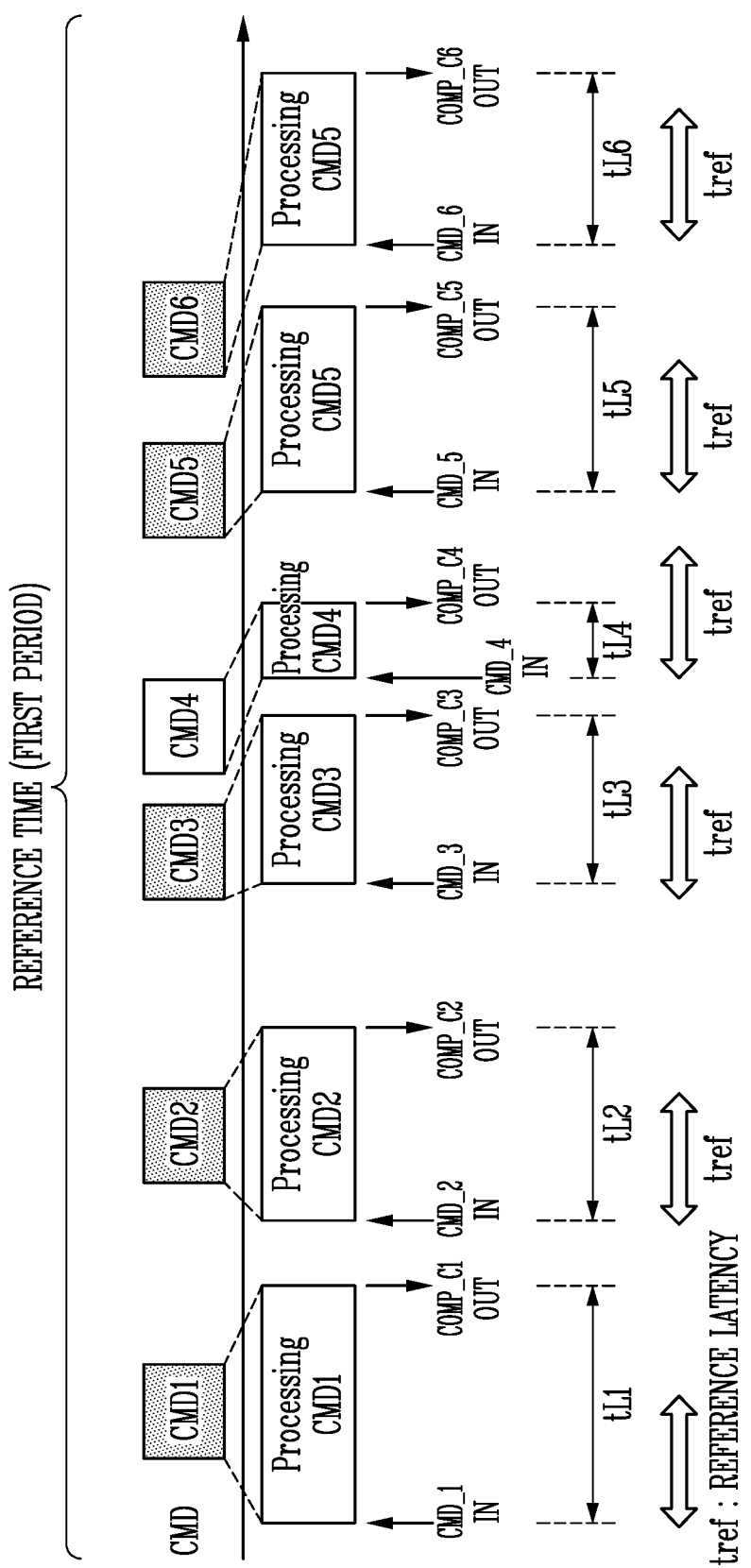
FIG. 8 is a diagram illustrating a process of counting the number of occurrences of over-latency exceeding reference latency according to an embodiment of the present disclosure.

FIG. 8 is a diagram illustrating a process of counting the number of occurrences of over-latency exceeding reference latency according to an embodiment of the present disclosure.

Referring to FIG. 8, the concept of latencies for commands provided during a preset reference time (first period) and a process of counting the number of occurrences of over-latency are illustrated. When the memory device is in a sustain state, a latency monitoring component may measure latencies for commands provided during the reference time. The reference time may have a preset time length. In this process, the number of occurrences of over-latency greater than reference latency tref may be counted.

In an embodiment, the host may provide a processing request for command 1 to a memory system. That is, when the host provides command 1 (CMD_1 IN), the memory system may process the corresponding command, and may provide a completion response to command 1 (COMP_C1 OUT) to the host. The time required from a time point at which the host provides command 1 to a time point at which a completion response to command 1 is provided may be latency tL1 for command 1. In this process, the latency monitoring component 240 may compare latency tL1 for command 1 with the reference latency tref. The reference latency tref may be a preset value. Because the value of latency tL1 for command 1 is greater than the value of the reference latency tref, latency tL1 for command 1 may be counted as over-latency.

The host may provide a processing request for command 2 to the memory system while command 1 is being processed or after a completion response to command 1 (COMP_C1 OUT) is received. That is, when the host provides command 2 (CMD_2 IN), the memory system may process the corresponding command, and may provide a completion response to command 2 (COMP_C2 OUT) to the host. The time required from a time point at which the host provides command 2 to a time point at which a completion response to command 2 is provided may be latency tL2 for command 2. In this process, the latency monitoring component 240 may compare latency tL2 for command 2 with reference latency tref. The value of the reference latency tref to be compared with the latency for command 2 may be equal to the value of the reference latency tref compared with the latency for command 1. Because the value of latency tL2 for command 2 is greater than the value of the reference latency tref, latency tL2 for command 2 may be counted as over-latency.

The host may provide a processing request for command 3 to the memory system while command 2 is being processed or after a completion response to command 2 (COMP_C2 OUT) is received. That is, when the host provides command 3 (CMD_3 IN), the memory system may process the corresponding command, and may provide a completion response to command 3 (COMP_C3 OUT) to the host. The time required from a time point at which the host provides command 3 to a time point at which a completion response to command 3 is provided may be latency tL3 for command 3. In this process, the latency monitoring component may compare latency tL3 for command 3 with reference latency tref. The value of the reference latency tref to be compared with the latency for command 3 may be equal to the value of the reference latency tref compared with the latency for command 1. Because the value of latency tL3 for command 3 is greater than the value of the reference latency tref, latency tL3 for command 3 may be counted as over-latency.

The host may provide a processing request for command 4 to the memory system while command 3 is being processed or after a completion response to command 3 (COMP_C3 OUT) is received. That is, when the host provides command 4 (CMD_4 IN), the memory system may process the corresponding command, and may provide a completion response to command 4 (COMP_C4 OUT) to the host. The time required from a time point at which the host provides command 4 to a time point at which a completion response to command 4 is provided may be latency tL4 for command 4. In this process, the latency monitoring component may compare latency tL4 for command 4 with reference latency tref. The value of the reference latency tref to be compared with the latency for command 4 may be equal to the value of the reference latency tref compared with the latency for command 1. Because the value of latency tL4 for command 4 is less than the value of the reference latency tref, latency tL4 for command 4 may not be counted as over-latency.

The host may provide a processing request for command 5 to the memory system while command 4 is being processed or after a completion response to command 4 (COMP_C4 OUT) is received. That is, when the host provides command 5 (CMD_5 IN), the memory system may process the corresponding command, and may provide a completion response to command 5 (COMP_C5 OUT) to the host. The time required from a time point at which the host provides command 5 to a time point at which a completion response to command 5 is provided may be latency tL5 for command 5. In this process, the latency monitoring component may compare latency tL5 for command 5 with reference latency tref. The value of the reference latency tref to be compared with the latency for command 5 may be equal to the value of the reference latency tref compared with the latency for command 1. Because the value of latency tL5 for command 5 is greater than the value of the reference latency tref, latency tL5 for command 5 may be counted as over-latency.

Similarly, the host may provide a processing request for command 6 to the memory system while command 5 is being processed or after a completion response to command 5 (COMP_C5 OUT) is received. That is, when the host provides command 6 (CMD_6 IN), the memory system may process the corresponding command, and may provide a completion response to command 6 (COMP_C6 OUT) to the host. The time required from a time point at which the host provides command 6 to a time point at which a completion response to command 6 is provided may be latency tL6 for command 6. In this process, the latency monitoring component may compare latency tL6 for command 6 with reference latency tref. The value of the reference latency tref to be compared with the latency for command 6 may be equal to the value of the reference latency tref compared with the latency for command 1. Because the value of latency tL6 for command 6 is greater than the value of the reference latency tref, latency tL6 for command 6 may be counted as over-latency.

The latency monitoring component 240 may store information about the number of occurrences of over-latency (i.e., 5) in the process of processing the six commands provided from the host during the reference time (first period). Also, the latency monitoring component may provide information about the number of occurrences of over-latency during the reference time to the completion response controller. Each of the commands provided from the host may be a read command or a write command.

The latency monitoring component may monitor latencies for the commands provided during the reference time (first period), and thereafter monitor latencies for commands provided during a reference time (a second period) following the first period. The process of monitoring latencies may be performed until the memory device escapes from the sustain state. That is, while a garbage collection (GC) operation is being performed in the memory device, the latency monitoring component may repeatedly perform a latency monitoring operation. Here, the time length of the following period may be equal to that of the previous period. Similarly, the latency monitoring component may provide information about the number of occurrences of over-latency counted for each period to the completion response controller.

Figure 9:
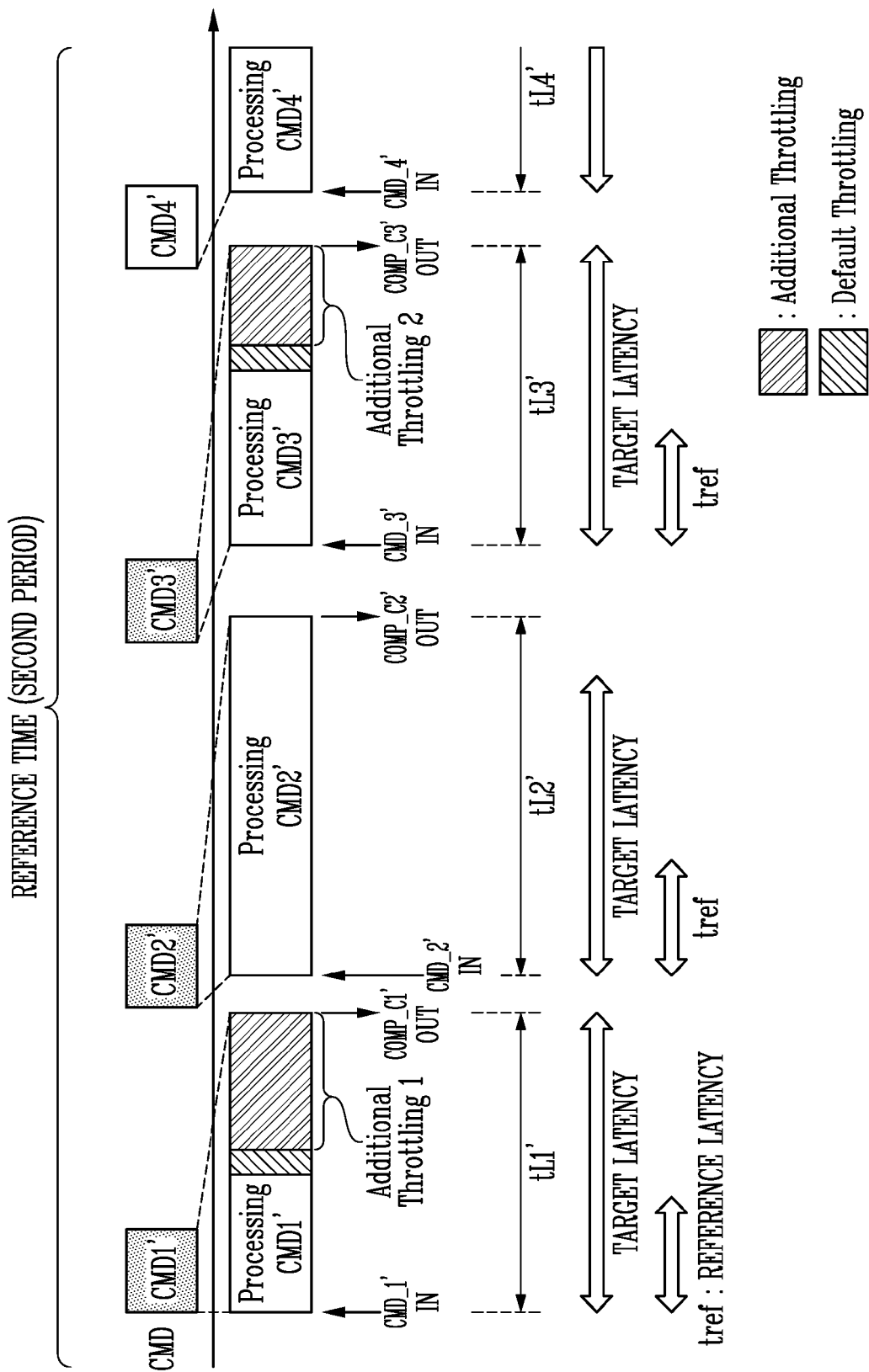
FIG. 9 is a diagram illustrating a process of delaying completion responses to commands depending on the target latency according to an embodiment of the present disclosure.

FIG. 9 is a diagram illustrating a process of delaying completion responses to commands in conformity with target latency according to an embodiment of the present disclosure.

Referring to FIG. 9, a process of performing an additional performance limitation in conformity with preset target latency is illustrated.

A completion response controller 250 may determine target latency to be applied in a second period based on the information about the number of occurrences of over-latency in the first period received from a latency monitoring component, and target latency information received from a target latency information storage. When the target latency is determined, the completion response controller may control provision of a command completion response in conformity with the target latency.

The completion response controller may delay provision of a completion response to each command through an average performance limitation (default throttling) and an additional performance limitation (additional throttling). When processing of the command provided from the host is completed, the completion response controller may compare a completion response waiting time with the target latency. Thereafter, when the target latency is longer than the completion response waiting time, the completion response controller may delay provision of the completion response to the command by the difference between the target latency and the completion response waiting time. Further, when the target latency is shorter than the completion response waiting time, the completion response controller may immediately provide the completion response to the command to the host without a performance limitation. In this case, the average performance limitation (i.e., default throttling) may be the performance limitation incurred to maintain the target latency at average latency latency_avg.

In an embodiment, during the reference time (i.e., second period) following the first period, the host may provide a processing request for command 1' to the memory system. That is, when the host provides command 1' (CMD_1' IN), the memory system 100 may process the corresponding command, and may provide a completion response to command 1' (COMP_C1' OUT) to the host. The completion response controller may delay the completion response to command 1' (COMP_C1' OUT) so that latency tL1' for command 1' is equal to the target latency. That is, the completion response to command 1' (COMP_C1' OUT) is not immediately provided to the host after processing of command 1' is completed, and provision of the completion response to command 1' (COMP_C1' OUT) may be delayed through performance limitation (throttling). The completion response controller may delay provision of the completion response to command 1' through average performance limitation (default throttling) even when processing of command 1' is completed. Because latency does not reach the target latency even after default throttling has occurred, the completion response controller may perform an additional performance limitation (additional throttling). After the completion response to command 1' is delayed by the difference between the target latency and the completion response waiting time, the completion response to command 1' (COMP_C1' OUT) may be provided to the host. In this case, latency tL1' for command 1' and the target latency may be equal to each other.

The host may provide a processing request for command 2' to the memory system while command 1' is being processed or after the completion response to command 1' (COMP_C1' OUT) is received. That is, when the host provides command 2' (CMD_2' IN), the memory system may process the corresponding command, and may provide a completion response to command 2' (COMP_C2' OUT) to the host. The completion response controller may control the completion response to command 2' (COMP_C2' OUT) so that latency tL2' for command 2' is equal to the target latency. When processing of command 2' is delayed and a completion response waiting time for command 2' is longer than the target latency, the completion response controller may immediately provide the completion response to command 2' (COMP_C2' OUT) to the host without performance limitation. In this case, latency tL2' for command 2' may be a value greater than that of the target latency.

The host may provide a processing request for command 3' to the memory system while command 2' is being processed or after the completion response to command 2' (COMP_C2' OUT) is received. That is, when the host provides command 3' (CMD_3' IN), the memory system may process the corresponding command, and may provide a completion response to command 3' (COMP_C3' OUT) to the host. The completion response controller may delay the completion response to command 3' (COMP_C3' OUT) so that latency tL3' for command 3' is equal to the target latency. That is, the completion response to command 3' (COMP_C3' OUT) is not immediately provided to the host after the processing of command 3' is completed, and provision of the completion response to command 3' (COMP_C3' OUT) may be delayed through performance limitation (throttling). The completion response controller may delay provision of the completion response to command 3' through average performance limitation (default throttling) even when processing of command 3' is completed. Because latency does not reach the target latency even after default throttling has occurred, the completion response controller may perform additional performance limitation (additional throttling). After the completion response to command 3' is delayed by the difference between the target latency and the completion response waiting time, the completion response to command 3' (COMP_C3' OUT) may be provided to the host. In this case, latency tL3' for command 3' and the target latency may be equal to each other.

The host may provide a processing request for command 4' to the memory system while command 3' is being processed or after a completion response to command 3' (COMP_C3' OUT) is received. That is, when the host provides command 4' (CMD_4' IN), the memory system may process the corresponding command, and may provide a completion response to command 4' (COMP_C4' OUT) to the host. However, during the reference time (second period), processing of command 4' may not be completed.

In a process of processing commands provided from the host and providing completion responses to the commands to the host during the reference time (second period), the latency monitoring component may monitor latencies tL1' to tL3' for command 1' to command 3'. In this process, the latency monitoring component may compare latencies tL1' to tL3' for command 1' to command 3' with the reference latency. The latency monitoring component may compare the reference latency tref with latencies tL1' to tL3' for command 1' to command 3, and may count the number of occurrences of over-latency greater than the reference latency tref. The reference latency may be equal to the reference latency tref that is the target of comparison for the reference time (first period). Because all of the latencies tL1' to tL3' for command 1' to command 3' are greater than the reference latency tref, the number of occurrences of over-latency for the reference time (second period) may be 3. The latency monitoring component may provide information about the number of occurrences of over-latency during the reference time (second period) to the completion response controller.

As the target latency increases, the time required to provide a completion response to the corresponding command may increase. The completion response controller may not provide a command completion response through default throttling and additional throttling even if processing of the corresponding command is rapidly completed. When the determined target latency has a value greater than that of the reference latency tref, all latencies for commands provided for the following period may be counted as over-latencies. However, the number of commands to be provided may decrease as the target latency increases. When the number of commands to be provided decreases, the number of occurrences of over-latency may also decrease. As the number of occurrences of over-latency decreases, the target latency may also decrease in proportion thereto. As the target latency decreases, the extent of performance limitation may also decrease. By means of the above-described process, a completion response to a command may be provided to the host depending on certain latency, thus improving the reliability of the host.

Figure 10:
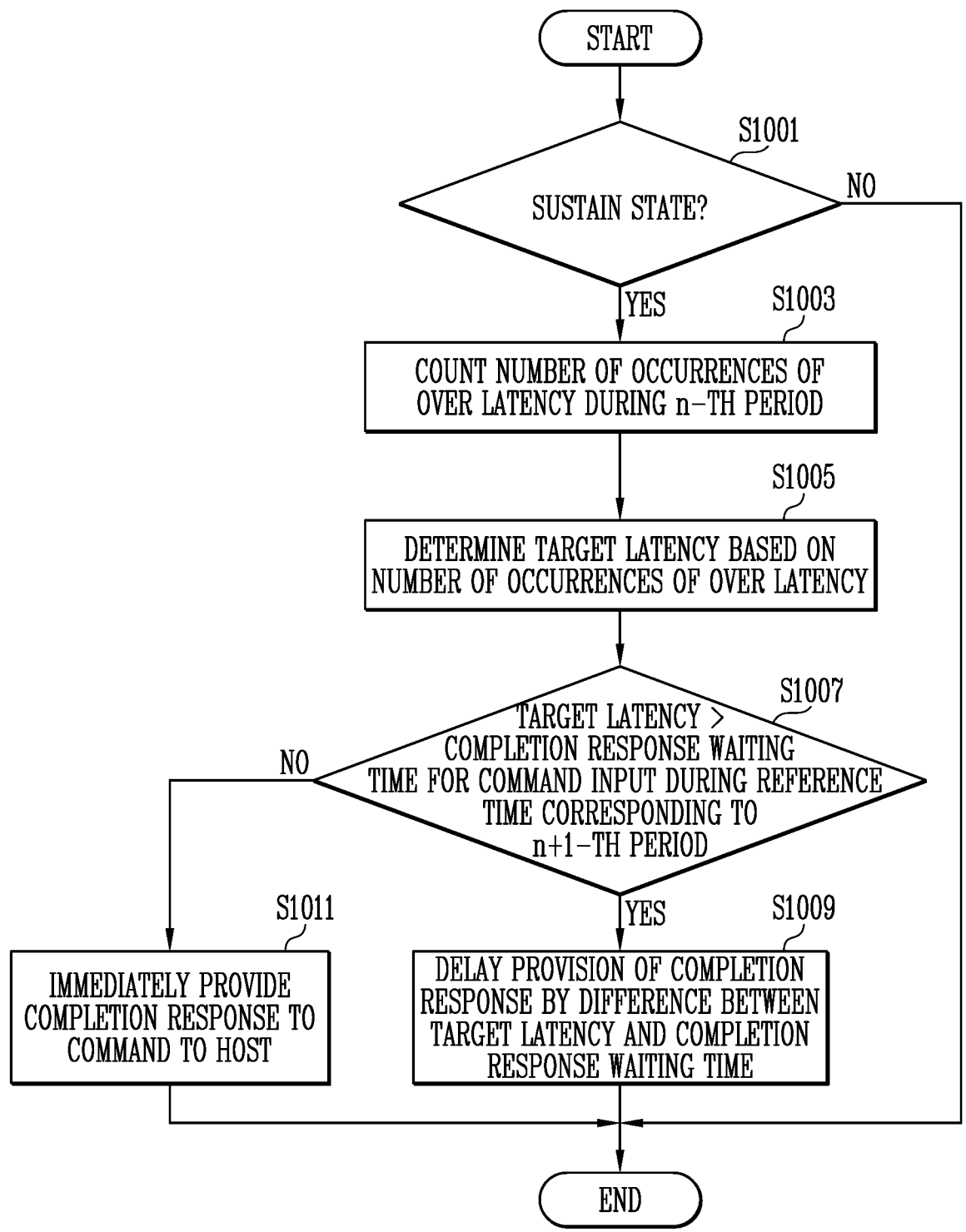
FIG. 10 is a flowchart illustrating a process of delaying a completion response to a command according to an embodiment of the present disclosure.

FIG. 10 is a flowchart illustrating a process of delaying a completion response to a command according to an embodiment of the present disclosure.

Referring to FIG. 10, at operation S1001, a memory controller may determine whether a memory device is currently in a sustain state. The sustain state may be determined depending on the number of free blocks, among a plurality of memory blocks included in the memory device. Each free block may be a block in which data is not stored. When the number of free blocks is less than a reference value, a garbage collection (GC) operation may be performed such that the memory device may be efficiently used. In this case, the memory controller may provide state information indicating that the memory device is in a sustain state.

At operation S1003, when the memory device is in the sustain state, the memory controller may count the number of occurrences of over-latency. Over-latency may be latency greater than preset reference latency tref. The memory controller may count the number of occurrences of over-latency during a reference time (an n-th period), and may provide information about the number of occurrences of over-latency.

At operation S1005, the memory controller may determine target latency based on the information about the number of occurrences of over-latency and target latency information.

At operation S1007, the memory controller may compare the target latency with a completion response waiting time. The completion response waiting time may be the time required from a time point at which the corresponding command is received from the host to a time point before a completion response to the command is provided. The memory controller may compare the target latency with the completion response waiting time for the command provided during the reference time (n+1-th period), and may determine whether to delay the completion response to the command.

At operation S1009, the memory controller 200 may delay provision of the command completion response to be provided to the host based on the result of a comparison between the target latency and the completion response waiting time. When the target latency is longer than the completion response waiting time for the command, the memory controller may delay provision of the command completion response by the difference between the target latency and the completion response waiting time. By means of this process, latency for the corresponding command may be equal to the target latency.

At operation S1011, the memory controller 200 may immediately provide the command completion response to the host based on the result of the comparison between the target latency and the completion response waiting time. When the completion response waiting time is longer than the target latency, the memory controller may immediately provide the command completion response to the host. Here, latency for the corresponding command may be equal to or greater than the target latency.

When the memory device is not in a sustain state, a garbage collection (GC) operation is not performed, and thus the command may be processed without performance limitation (throttling). Therefore, when the memory device is not in a sustain state, the above-described process may not be performed.

Figure 11:
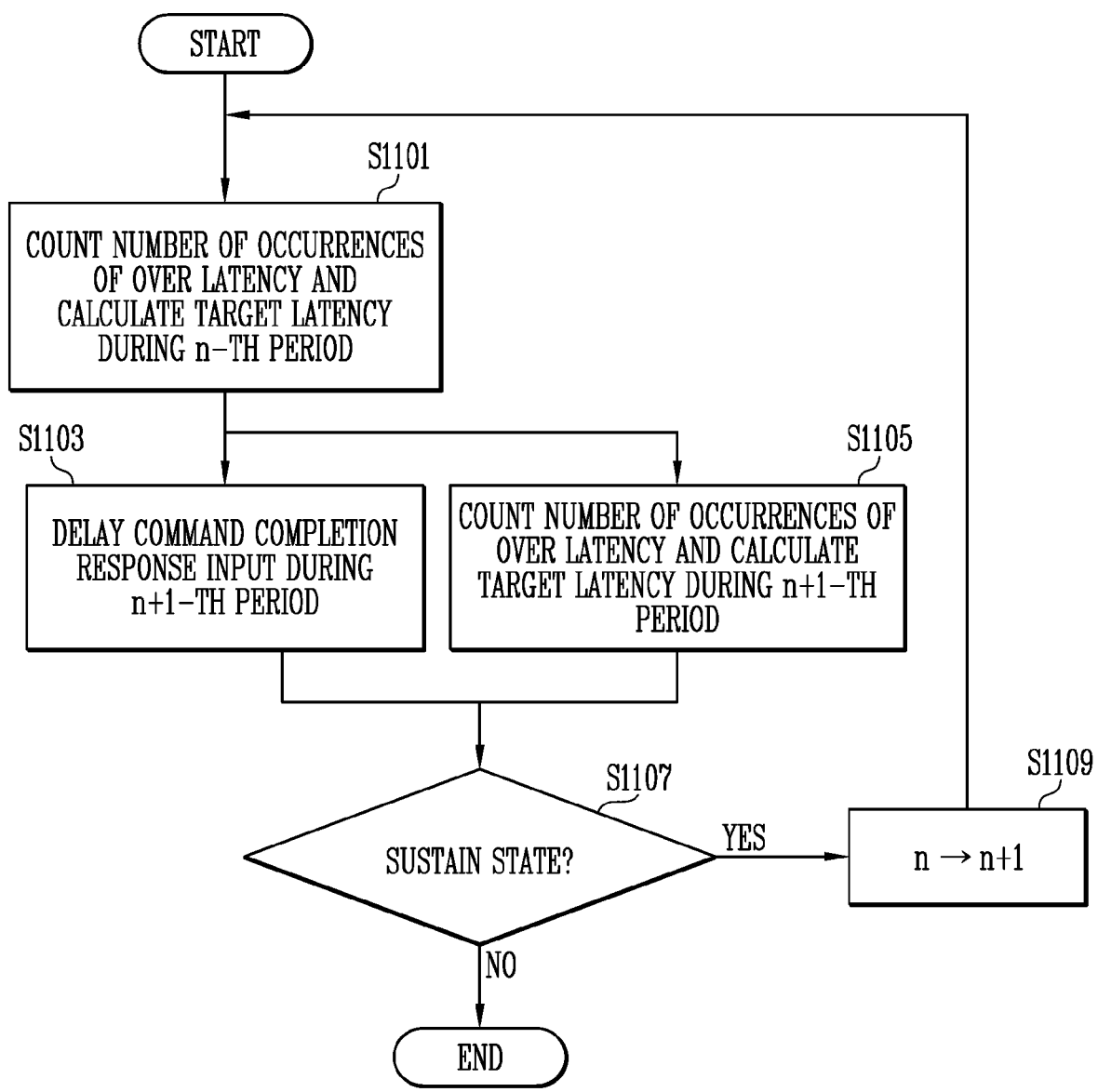
FIG. 11 is a flowchart illustrating a process of periodically calculating over-latency and delaying a command completion response according to an embodiment of the present disclosure.

FIG. 11 is a flowchart illustrating a process of periodically calculating over-latency and delaying a command completion response according to an embodiment of the present disclosure.

Referring to FIG. 11, at operation S1101, the memory controller may count the number of occurrences of over-latency during a reference time (n-th period), and may calculate target latency determined depending on the number of occurrences of over-latency. Provision of completion responses to commands that are provided during a reference time (n+1-th period) may be delayed based on the target latency determined depending on the number of occurrences of over-latency during the reference time (n-th period).

At operation S1103, the memory controller may delay provision of completion responses to commands provided during the reference time (n+1-th period). This process may include a procedure of comparing the target latency with a completion response waiting time for each of commands and providing a command completion response based on the result of the comparison.

At operation S1105, the memory controller may count the number of occurrences of over-latency greater than reference latency tref, among latencies for commands provided during the reference time (n+1-th period), and may then calculate the target latency. Operations S1103 and S1105 may be simultaneously performed.

At operation S1107, the memory controller may determine whether the memory device is in a sustain state. When it is determined that the memory device is not in a sustain state, additional throttling is not required, and thus the process may be terminated. On the other hand, when it is determined that the memory device is in the sustain state, operations S1101 to S1107 may be repeatedly performed during the n+1-th period and an n+2-th period at operation S1109. In this process, time lengths of the n+1-th period and the n+2-th period may be equal to those of the n-th period and the n+1-th period.

Figure 12:
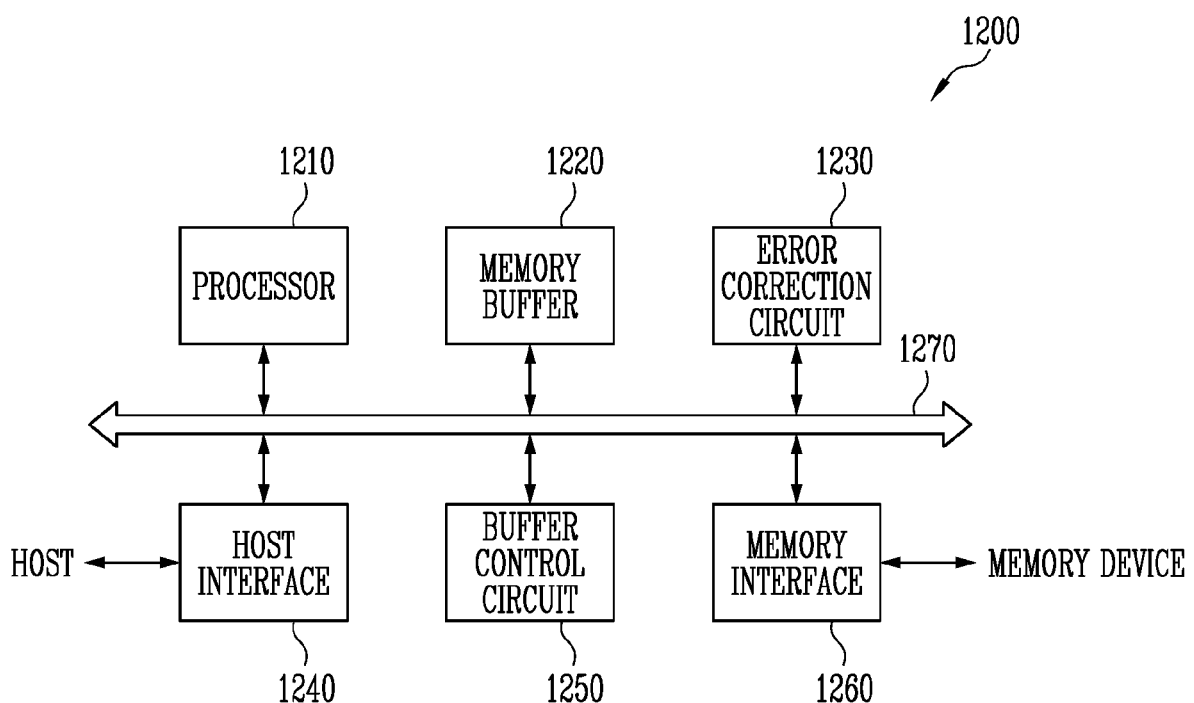
FIG. 12 is a diagram illustrating a memory controller according to an embodiment of the present disclosure.

FIG. 12 is a diagram illustrating a memory controller 1200 according to an embodiment of the present disclosure.

The memory controller 1200 is coupled to a host and a memory device. In response to a request from the host, the memory controller 1200 may access the memory device. For example, the memory controller 1200 may control write, read, erase, and background operations of the memory device. The memory controller 1200 may provide an interface between the memory device and the host. The memory controller 1200 may run firmware for controlling the memory device.

Referring to FIG. 12, the memory controller 1200 may include a processor 1210, a memory buffer 1220, an error correction (error correction code: ECC) circuit 1230, a host interface 1240, a buffer control circuit 1250, a memory interface 1260, and a bus 1270.

The bus 1270 may provide a channel between components of the memory controller 1200.

The processor 1210 may control the overall operation of the memory controller 1200 and perform a logical operation. The processor 1210 may communicate with the external host through the host interface 1240, and may communicate with the memory device through the memory interface 1260. Further, the processor 1210 may communicate with the memory buffer 1220 through the buffer control circuit 1250. The processor 1210 may control the operation of a memory system by using the memory buffer 1220 as a working memory, a cache memory or a buffer memory.

The processor 1210 may perform a function of a flash translation layer (FTL). The processor 1210 may translate a logical block address (LBA), provided by the host, into a physical block address (PBA) through the FTL.

The processor 1210 may randomize data received from the host. For example, the processor 1210 may use a randomizing seed to randomize data received from the host. The randomized data may be provided, as data to be stored, to the memory device, and may be written to a memory cell array.

The processor 1210 may derandomize the data received from the memory device during a read operation. For example, the processor 1210 may derandomize the data received from the memory device using a derandomizing seed. Derandomized data may be output to the host.

In an embodiment, the processor 1210 may run software or firmware to perform the randomizing or derandomizing operation.

The memory buffer 1220 may be used as a working memory, a cache memory, or a buffer memory of the processor 1210. The memory buffer 1220 may store codes and commands that are executed by the processor 1210. The memory buffer 1220 may store data that is processed by the processor 1210. The memory buffer 1220 may include a static RAM (SRAM) or a dynamic RAM (DRAM).

The error correction circuit 1230 may perform error correction. The error correction circuit 1230 may perform error correction code (ECC) encoding based on data to be stored in the memory device through the memory interface 1260. The ECC-encoded data may be transferred to the memory device through the memory interface 1260. The error correction circuit 1230 may perform ECC decoding on data received from the memory device through the memory interface 1260. In an example, the error correction circuit 1230 may be included, as the component of the memory interface 1260, in the memory interface 1260.

The buffer control circuit 1250 may control the memory buffer 1220 under the control of the processor 1210.

The memory interface 1260 may communicate with the memory device under the control of the processor 1210. The memory interface 1260 may transmit/receive commands, addresses, and data to/from the memory device through channels.

In an embodiment, the memory controller 1200 may not include the memory buffer 1220 and the buffer control circuit 1250.

In an embodiment, the processor 1210 may control the operation of the memory controller 1200 using codes. The processor 1210 may load codes from a nonvolatile memory device (e.g., ROM) provided in the memory controller 1200. In an embodiment, the processor 1210 may load codes from the memory device through the memory interface 1260.

In an embodiment, the bus 1270 of the memory controller 1200 may be divided into a control bus and a data bus. The data bus may transmit data in the memory controller 1200, and the control bus may transmit control information, such as commands or addresses, in the memory controller 1200. The data bus and the control bus may be separated from each other, and may neither interfere with each other nor influence each other. The data bus may be coupled to the host interface 1240, the buffer control circuit 1250, the error correction circuit 1230, and the memory interface 1260. The control bus may be coupled to the host interface 1240, the processor 1210, the buffer control circuit 1250, the memory buffer 1220, and the memory interface 1260.

Figure 13:
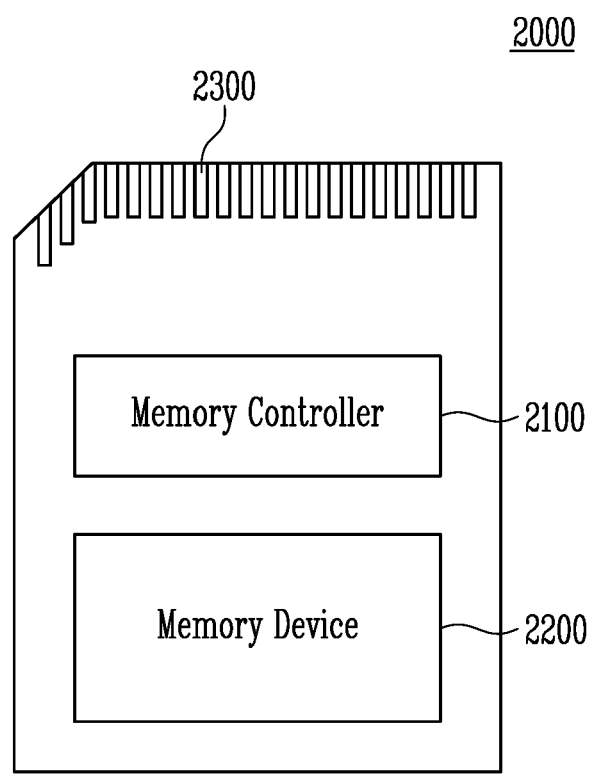
FIG. 13 is a diagram illustrating a memory card system to which a storage device according to an embodiment of the present disclosure is applied.

FIG. 13 is a diagram illustrating a memory card system 2000 to which a storage device according to an embodiment of the present disclosure is applied.

Referring to FIG. 13, the memory card system 2000 may include a memory controller 2100, a memory device 2200, and a connector 2300. The memory controller 2100 may be implemented in the same manner as the memory controller 200, described above with reference to FIG. 1.

In an embodiment, the memory controller 2100 may include components, such as a RAM, a processor, a host interface, a memory interface, and an error correction circuit.

The memory controller 2100 and the memory device 2200 may be integrated into a single semiconductor device to form a memory card. For example, the memory controller 2100 and the memory device 2200 may be integrated into a single semiconductor device to form a memory card, such as a PC card (i.e., personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 14:
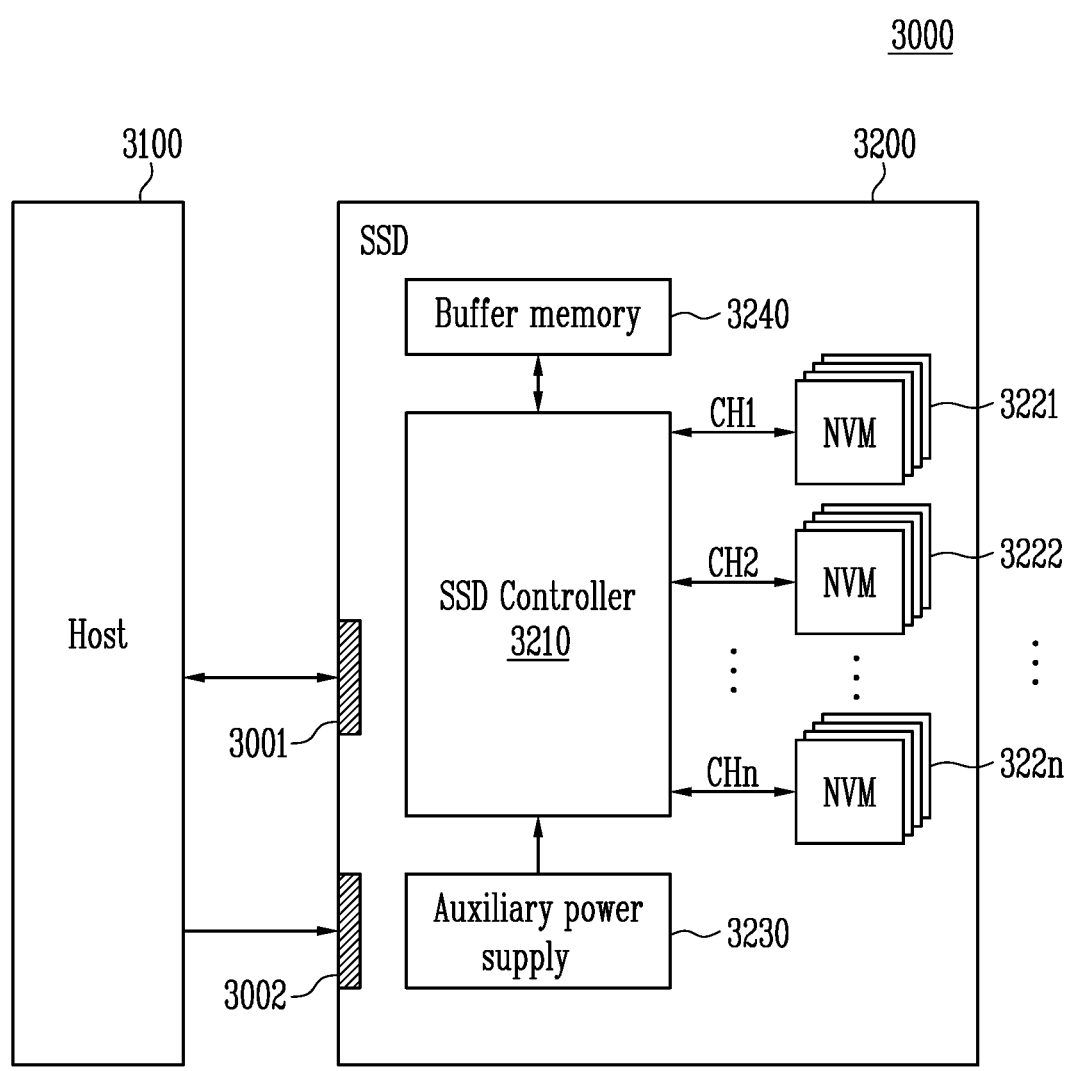
FIG. 14 is a diagram illustrating an example of a solid state drive (SSD) system to which a memory system according to an embodiment of the present disclosure is applied.

FIG. 14 is a diagram illustrating an example of a solid state drive (SSD) system 3000 to which a memory system according to an embodiment of the present disclosure is applied.

Referring to FIG. 14, the SSD system 3000 includes a host 3100 and an SSD 3200. The SSD 3200 may exchange a signal with the host 3100 through a signal connector 3001, and may be supplied with power through a power connector 3002. The SSD 3200 may include an SSD controller 3210, a plurality of flash memories 3221 to 322*n*, an auxiliary power supply 3230, and a buffer memory 3240.

In an embodiment, the SSD controller 3210 may perform a function of the memory controller 200, described above with reference to FIG. 1.

The SSD controller 3210 may control the plurality of flash memories 3221 to 322*n* in response to the signal received from the host 3100. In an embodiment, the signal SIG may include signals based on the interfaces of the host 3100 and the SSD 3200.

The auxiliary power supply 3230 may be coupled to the host 3100 through the power connector 3002. The auxiliary power supply 3230 may be supplied with power from the host 3100, and may be charged. The auxiliary power supply 3230 may supply the power to the SSD 3200 when the supply of power from the host 3100 is not smoothly performed. In an embodiment, the auxiliary power supply 3230 may be located inside the SSD 3200 or located outside the SSD 3200. For example, the auxiliary power supply 3230 may be located in a main board, and may also provide auxiliary power to the SSD 3200.

The buffer memory 3240 may function as a buffer memory for the SSD 3200. For example, the buffer memory 3240 may temporarily store data received from the host 3100 or data received from the plurality of flash memories 3221 to 322*n*, or may temporarily store metadata (e.g., mapping tables) of the flash memories 3221 to 322*n*. The buffer memory 3240 may include volatile memories, such as DRAM, SDRAM, DDR SDRAM, LPDDR SDRAM, and GRAM, or nonvolatile memories, such as FRAM, ReRAM, STT-MRAM, and PRAM.

Figure 15:
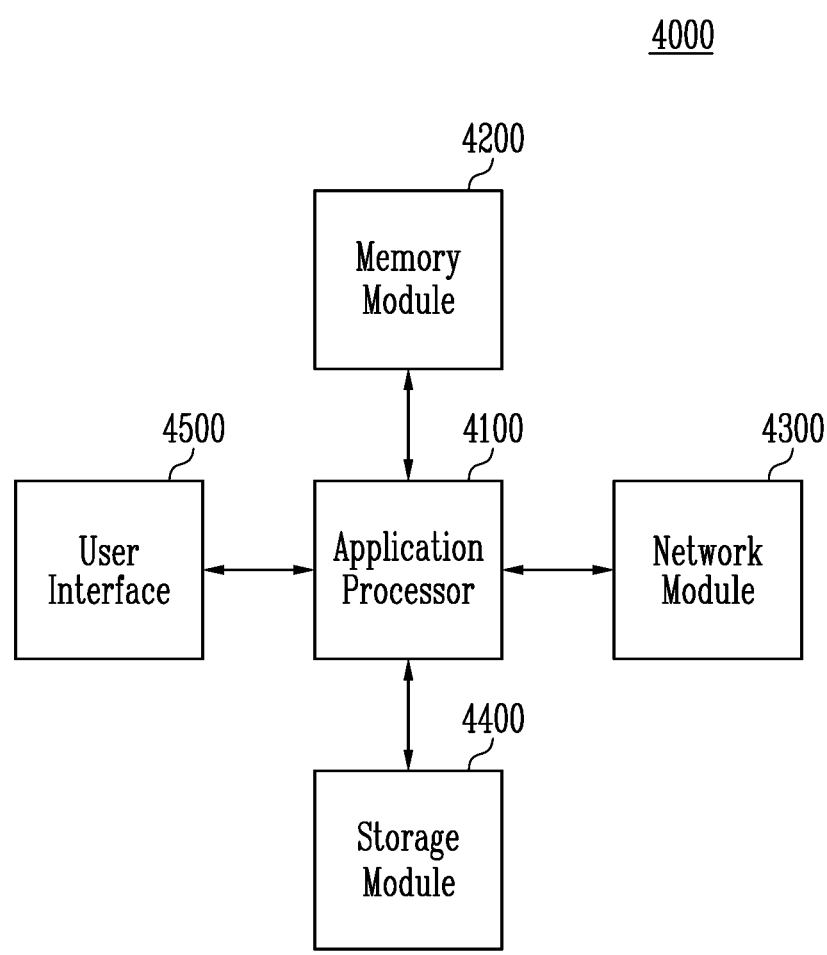
FIG. 15 is a diagram illustrating a user system to which a memory system according to an embodiment of the present disclosure is applied.

FIG. 15 is a diagram illustrating a user system to which a memory system according to an embodiment of the present disclosure is applied.

Referring to FIG. 15, a user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided in the form of a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDARM, LPDDR2 SDRAM, and LPDDR3 SDRAM or nonvolatile RAMs such as PRAM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as code division multiple access (CDMA), global system for mobile communication (GSM), wideband CDMA (WCDMA), CDMA-2000, time division multiple access (TDMA), long term evolution (LTE), Wimax, wireless LAN (WLAN), UWB, Bluetooth, or Wi-Fi. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (removable drive), such as a memory card or an external drive of the user system 4000.

In an embodiment, the storage module 4400 may include a plurality of nonvolatile memory devices, each of which may be operated in the same manner as the memory device 110, described above with reference to FIG. 1. The storage module 4400 may be operated in the same manner as the memory system 100, described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light-emitting diode (OLED) display device, an active matrix OLED (AMOLED) display device, an LED, a speaker, and a monitor.

In accordance with the present disclosure, there are provided a memory system that provides uniform performance even in a sustain state and a method of operating the memory system.

The embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory controller comprising:
   a latency monitoring component configured to generate information about a number of occurrences of over-latency exceeding a preset reference latency among latencies each indicating a time amount required from a time point at which first command is received from an external device to a time point at which a completion response to the first command is transmitted to the external device during a first period; and
   a completion response controller configured to determine a first target latency based on the information about the number of occurrences of over-latency, and provide, during a second period following the first period, the external device with a completion response to a second command provided from the external device after the first target latency has elapsed,
   wherein the information is determined using an average latency of the latencies during the first period and a maximum latency which has a largest latency among the latencies.

2. The memory controller according to claim 1, further comprising a target latency information storage configured to store therein target latency information corresponding to the number of occurrences of over-latency, and provide the target latency information to the completion response controller.

3. The memory controller according to claim 1, further comprising a state controller configured to provide the latency monitoring component with state information indicating that the memory device is in a sustain state when a number of free blocks included in the memory device is less than a preference value.

4. The memory controller according to claim 2, wherein the target latency information includes a latency value increasing in proportion to the number of occurrences of over-latency.

5. The memory controller according to claim 4,
   wherein the latency value is between the average latency and the maximum latency,
   wherein the average latency is incurred to achieve average performance in a sustain state in which a number of free blocks included in the memory device is less than a reference value, and
   wherein the maximum latency is incurred to achieve minimum performance required by the external device.

6. The memory controller according to claim 1, wherein each of the first command and the second command is one of a read command and a write command.

7. The memory controller according to claim 1, wherein the completion response controller is configured to provide the completion response to the second command immediately when an operation corresponding to the second command is completed after the first target latency has elapsed.

8. A memory system comprising:
   a memory device including a plurality of memory blocks; and
   a memory controller configured to delay a completion response to a second command provided from a host during a second period following a first period, based on a number of occurrences of over-latency exceeding a preset reference latency among latencies each indicating a time amount required from a time point at which a first command for the memory device is received from the host to a time point at which a completion response to the first command is provided during the first period,
   wherein an amount of delay for the completion response to the second command is determined using an average latency of the latencies during the first period and a maximum latency which has a largest latency among the latencies.

9. The memory system according to claim 8, wherein the memory controller comprises:
   a target latency information storage configured to store therein target latency information corresponding to the number of occurrences of over-latency;
   an operation controller configured to generate information about the number of occurrences of over-latency when a number of free blocks is less than a reference value among memory blocks included in the memory device; and
   a performance controller configured to select a first target latency based on the information about the number of occurrences of over-latency and the target latency information, and delay the completion response to the second command based on the first target latency.

10. The memory system according to claim 9, wherein the target latency information includes a latency value increasing in proportion to the number of occurrences of over-latency.

11. The memory system according to claim 10,
wherein the latency value is between the average latency and the maximum latency,
wherein the average latency is incurred to achieve average performance in a sustain state in which the number of free blocks is less than the reference value, and
wherein the maximum latency is incurred to achieve minimum performance required by the host.

12. The memory system according to claim 9,
wherein the performance controller is configured to delay the completion response to the second command by an amount corresponding to a difference between the first target latency and a completion response waiting time when the first target latency is longer than the completion response waiting time, and
wherein the completion response waiting time is from a time point at which the second command is received from the host to a time point at which the completion response to the second command is to be provided.

13. The memory system according to claim 11, wherein the performance controller is configured to provide the completion response to the second command to the host immediately when the first target latency is shorter than a completion response waiting time that is from a time point at which the second command is received from the host to a time point at which the completion response to the second command is to be provided.

14. The memory system according to claim 8, wherein each of the first commands and the second commands is one of a read command and a write command.

15. A method of operating a memory controller, the method comprising:

counting a number of occurrences of over-latency exceeding a preset reference latency among latencies each indicating a time amount required from a time point at which a first command is received from an external device to a time point at which a completion response to the first command is transmitted to the external device during a first period; and delaying a completion response to a second command provided from the external device during a second period following the first period depending on a first target latency determined based on the number of occurrences of over-latency, an average latency of the latencies during the first period and a maximum latency which has a largest latency among the latencies.

16. The method according to claim 15,
wherein the delaying the completion responses comprises:
comparing the first target latency with a completion response waiting time; and
delaying the completion response to the second command by an amount corresponding to a difference between the first target latency and the completion response waiting time when the first target latency is longer than the completion response waiting time, and
wherein the completion response waiting time is from a time point at which the second command is received from the external device to a time point at which the completion response to the second command is to be provided.

17. The method according to claim 15, wherein each of the first command and the second command is one of a read command and a write command.

18. The method according to claim 15, wherein the number of occurrences of over-latency during the first period is counted when a number of free blocks included in a memory device controlled by the memory controller is less than a reference value.

* * * * *